United States Patent
Jones et al.

(10) Patent No.: US 9,191,916 B1
(45) Date of Patent: Nov. 17, 2015

(54) METHOD AND SYSTEM FOR SKEWING LOCATION DETERMINATIONS

(71) Applicant: Sprint Spectrum L.P., Overland Park, KS (US)

(72) Inventors: Bryce A. Jones, Overland Park, KS (US); Sal Cerda, Peculiar, MO (US); Stephen D. Williams, Olathe, KS (US); Mark J. Bonn, Granite Bay, CA (US); Michael P. McMullen, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 57 days.

(21) Appl. No.: 14/040,803

(22) Filed: Sep. 30, 2013

(51) Int. Cl.
*H04W 24/00* (2009.01)
*H04W 64/00* (2009.01)

(52) U.S. Cl.
CPC .................................. *H04W 64/003* (2013.01)

(58) Field of Classification Search
USPC .......... 455/456.1–456.6, 404.2; 370/338, 252
See application file for complete search history.

(56) References Cited

U.S. PATENT DOCUMENTS

| | | | |
|---|---|---|---|
| 7,292,864 B1 * | 11/2007 | Al-Khashti et al. ........ | 455/456.1 |
| 8,195,190 B1 * | 6/2012 | Hou ............................ | 455/456.1 |
| 8,761,719 B1 * | 6/2014 | Hines et al. ................. | 455/404.2 |
| 2001/0046870 A1 * | 11/2001 | Stilp et al. ..................... | 455/456 |
| 2002/0050944 A1 * | 5/2002 | Sheynblat et al. ....... | 342/357.06 |
| 2003/0017832 A1 * | 1/2003 | Anderson et al. .............. | 455/456 |
| 2004/0017312 A1 * | 1/2004 | Anderson et al. .............. | 342/457 |
| 2004/0152471 A1 * | 8/2004 | MacDonald et al. ...... | 455/456.1 |
| 2004/0203853 A1 * | 10/2004 | Sheynblat .................. | 455/456.1 |
| 2005/0107953 A1 * | 5/2005 | Sugla ............................ | 701/300 |
| 2005/0192024 A1 * | 9/2005 | Sheynblat .................. | 455/456.1 |
| 2005/0206566 A1 * | 9/2005 | Stilp et al. ..................... | 342/455 |
| 2007/0287473 A1 * | 12/2007 | Dupray ...................... | 455/456.1 |
| 2010/0144324 A1 * | 6/2010 | Wright et al. .............. | 455/414.1 |
| 2011/0051658 A1 * | 3/2011 | Jin et al. ........................ | 370/328 |
| 2012/0058775 A1 * | 3/2012 | Dupray et al. ............. | 455/456.1 |
| 2012/0129550 A1 * | 5/2012 | Hannan et al. ............. | 455/456.1 |
| 2013/0033999 A1 * | 2/2013 | Siomina et al. ............... | 370/252 |
| 2013/0052984 A1 * | 2/2013 | Mohler et al. ............. | 455/404.2 |

(Continued)

OTHER PUBLICATIONS

Network World Buzzblog, "Unlucky Las Vegas man besieged by lost-phone seekers", Jan. 14, 2013.

(Continued)

*Primary Examiner* — Nathan Taylor

(57) ABSTRACT

A mobile location system (MLS) may receive a request to provide a representative location of a user equipment device (UE). In response to receiving the request, the MLS may apply a location determination process so as to determine a location of the UE. The MLS may then determine that the determined location of the UE coincides with an existing location of another entity, such as a private address. In response to determining that the determined location of the UE coincides with the existing location of the other entity, the MLS may adjust the determined location to not coincide with the existing location of the other entity. The adjusted determined location may be a road segment, geodetic marker, or property boundary. The MLS may then provide a response to the request, in which the response identifies the adjusted determined location of the UE as the representative location of the UE.

20 Claims, 5 Drawing Sheets

(56) References Cited

U.S. PATENT DOCUMENTS

| | | | |
|---|---|---|---|
| 2013/0285855 A1* | 10/2013 | Dupray et al. | 342/451 |
| 2013/0288692 A1* | 10/2013 | Dupray et al. | 455/450 |
| 2014/0171105 A1* | 6/2014 | Al-Mufti et al. | 455/456.1 |
| 2014/0241334 A1* | 8/2014 | Martin et al. | 370/338 |

OTHER PUBLICATIONS iMore, "Sprint location glitch leads owners of stolen phones to the home of unknowing Las Vegas man", Kazmucha, Jan. 15, 2013.

* cited by examiner

METHOD AND SYSTEM FOR SKEWING LOCATION DETERMINATIONS

BACKGROUND

Unless otherwise indicated herein, the materials described in this section are not prior art to the claims and are not admitted to be prior art by inclusion in this section.

A typical cellular wireless network operated by a wireless service provider, such as a radio access network (RAN), includes a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

An important feature of contemporary cellular wireless networks is an ability to locate the geographical position of a UE. Such a feature may be used for a variety of location-based services. As an example, location information of the UE may be used to assist emergency services, such as Enhanced 9-1-1 services, in locating a UE. For instance, when a 9-1-1 call is placed, the 9-1-1 call may be routed by the PSTN to be answered at one of many public safety answering points (PSAPs), each PSAP serving a particular area, such as a city, county, or metropolitan area.

In practice, when a location-based service provider/application (e.g., a cellular wireless carrier or third party) or other entity wants to determine the location of a UE, the location-based service provider may send a location request message to the wireless carrier that serves the UE (or, if the location-based service provider is itself the carrier, then the location-based service provider may send the request within the carrier's network to a designated entity or logic for handling). In response, the carrier may engage in a process to determine where the UE is currently located, generate a response to the location request, and send the response to the location-based service provider.

In some implementations, a wireless carrier will operate a mobile location system (MLS) (or, "mobile location server") that is arranged to determine and report UE locations to requesting entities, such as a PSAP. The MLS may include a mobile positioning center (MPC) and a position determining entity (PDE), which may be integrated together. The MLS may function to determine the location of a given UE based on various factors such as (i) the identity and location of the cell/sector in which the UE is currently operating, (ii) satellite-based positioning information provided by the UE, (iii) round trip signal delay measurements, and/or (iv) signal strength measurements. Further, the carrier may operate a front end server for receiving location requests from location-based service providers and forwarding those requests to the MLS.

When the MLS receives a request for the location of a particular UE, the MLS (e.g., MPC/PDE) may thus determine the location of the UE. The MLS may then return the determined location of the UE to the requesting entity, and the requesting entity may then report or make use of the determined location, such as to provide a location-based service (e.g., delivering emergency aid to the UE's location, sending a law enforcement unit to the UE's location, or delivering to the UE content established or selected based on the UE's location).

In some scenarios, however, the MLS or other location-determining entity may not be able to determine a precise location of a UE for a requesting entity, and may instead determine an estimated location of the UE using one or more low-accuracy location determination processes. For instance, the MLS may determine the location of the UE to be a centroid of a cell sector in which the UE is operating. As another example, the MLS may determine the location of the UE to merely be a location of a base station that is serving the UE.

However, a problem may arise in these scenarios. For example, the determined location of the UE may coincide with an existing location of another entity, such as a home residence, school institution, or other private address where the UE is not actually located. As a result, the requesting entity may send law enforcement or other unwanted services/content to the existing location of the other entity, believing the UE to be located there.

OVERVIEW

Disclosed herein is a method and corresponding system to help overcome the problem described above. As disclosed, the MLS or other network entity may adjust the determined location of the UE so that the adjusted determined location no longer coincides with the existing location of the other entity. For instance, the determined location may be adjusted to instead coincide with a non-private location such as a road segment, property boundary, or geodetic marker. In turn, the MLS may then provide the adjusted determined location to the requesting entity.

In one respect, the method includes the MLS receiving a request to provide a representative location of a UE. The method also includes, in response to receiving the request, the MLS applying a location determination process so as to determine a location of the UE. The method further includes the MLS determining that the determined location of the UE coincides with an existing location of another entity. The method then includes, in response to determining that the determined location of the UE coincides with the existing location of the other entity, the MLS adjusting the determined location to not coincide with the existing location of the other entity. Further, the method includes the MLS providing a response to the request, where the response identifies the adjusted determined location of the UE as the representative location of the UE.

In another respect, disclosed is a MLS that includes a network communication interface, at least one processor, data storage, and program logic stored in the data storage and executable by the processor to carry out functions. The functions include receiving, via the network communication interface, a request to provide a representative location of a UE. The functions also include, in response to receiving the request, applying a location determination process so as to determine a location of the UE. Further, the functions include determining that the determined location of the UE coincides with an existing location of another entity. Still further, the functions include, in response to determining that the determined location of the UE coincides with the existing location of the other entity, adjusting the determined location to not coincide with the existing location of the other entity. And, in turn, the functions include providing, via the network communication interface, a response to the request, where the response identifies the adjusted determined location of the UE as the representative location of the UE.

In yet another respect, disclosed is a non-transitory computer-readable medium having stored thereon program instructions executable by a MLS to cause the MLS to perform functions. The functions include receiving a request to provide a representative location of a UE. The functions also include, in response to receiving the request, applying a location determination process so as to determine a location of the UE. Further, the functions include determining that the determined location of the UE coincides with an existing location of another entity. And the functions then include, in response to determining that the determined location of the UE coincides with the existing location of the other entity, adjusting the determined location to not coincide with the existing location of the other entity. Further, the functions include providing a response to the request, where the response identifies the adjusted determined location of the UE as the representative location of the UE.

This overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

I. Introduction

The present method and system will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

II. Example Communication System

Figure 1:
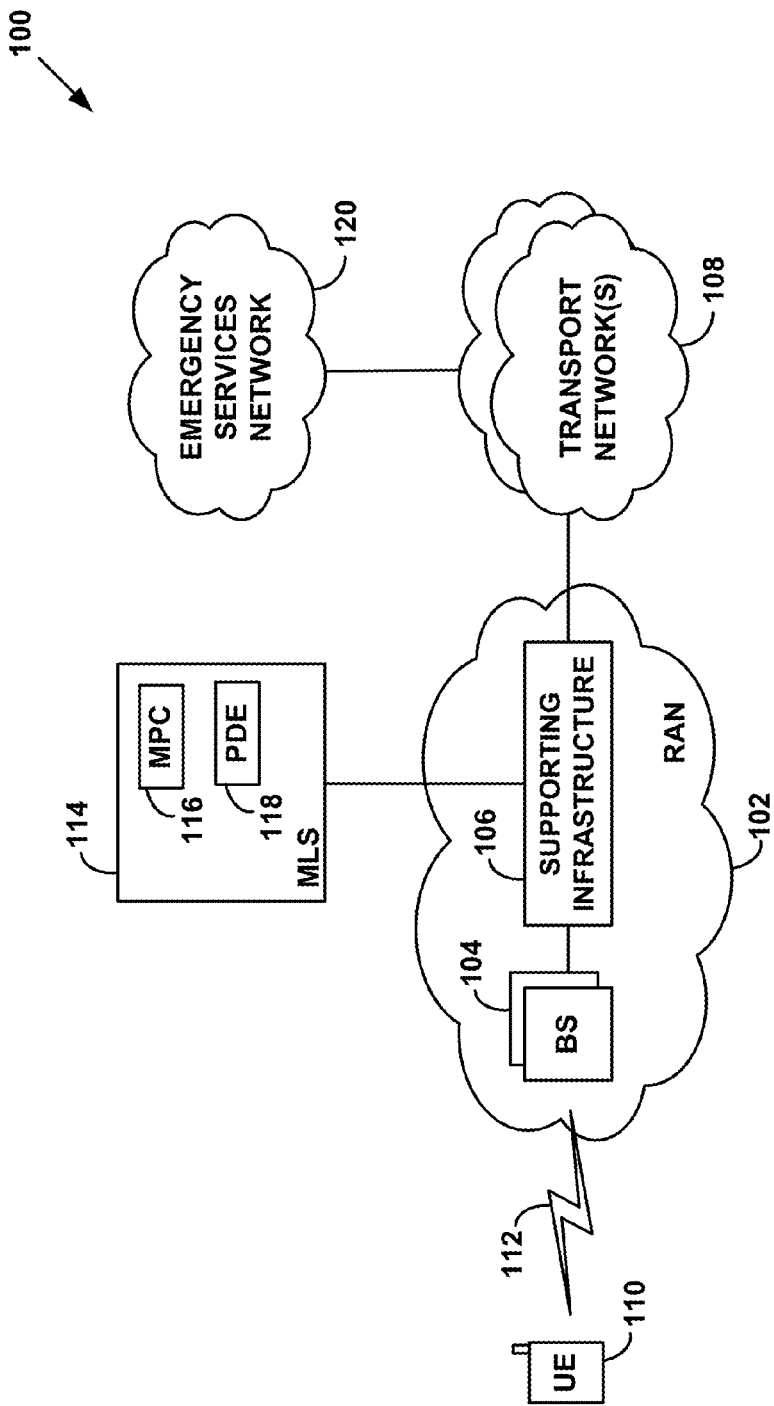
FIG. 1 depicts a simplified block diagram of a communication system, in accordance with an example embodiment.

FIG. 1 depicts a simplified block diagram of an example communication system 100, in which example embodiments can be implemented. As shown, the example system 100 includes a radio access network (RAN) 102 having one or more base stations 104 (e.g., base transceiver stations (BTS), access nodes, node-Bs, eNodeBs (eNB), or the like) that radiate to define a number of cells or cell sectors. Further, the RAN 102 then includes supporting infrastructure 106, such as a base station controller, radio network controller, mobility management entity, mobile switching center, and/or gateway, which may function to control aspects of base station operation and/or to provide connectivity with one or more transport networks 108 such as the PSTN, a packet-switched network, and/or the Internet.

FIG. 1 further illustrates a representative UE 110 that is positioned within coverage of one or more of the base stations 104. The UE 110 may be any device that is equipped to engage in wireless communication with the RAN 102 and to carry out various UE functions described herein. By way of example, the UE 110 may be a cell phone, or wirelessly-equipped tablet, computer, tracking device, appliance, embedded wireless module, or other wirelessly-equipped device of a type now known or later developed. The UE 110 may engage in communication over an air interface 112 with one of the base stations 104 and may thereby communicate via the base station 104 with the RAN 102. This air interface communication may operate in accordance with an air interface protocol, such as Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1xRTT and 1xEV-DO), Global System for Mobile Communications (GSM), microwave, satellite, MMDS, Wi-Fi (e.g., IEEE 802.11), and Bluetooth, among others. Each protocol may define its own procedures and parameters related to air interface communication.

The example system 100 may also include a mobile location system (MLS) 114 that functions to determine and report locations of UEs in the RAN 102 to requesting entities so as to facilitate location-based services, as noted above. As further noted above, the MLS 114 may include a mobile positioning center (MPC) 116 and a position determining entity (PDE) 118, which may be integrated together and may apply a location determination process so as to determine the location of the UE 110 to be reported to requesting entities.

The example system 100 may also include an emergency services network 120 that may include one or more PSAPs and/or other requesting entities. As shown, the supporting infrastructure 106 of the RAN 102 may function to provide connectivity between the UE 110, the MLS 114, and the emergency services network 120 to facilitate location-based services. In response to receiving a location report of the UE 110, the emergency services network 120 may facilitate a dispatch of emergency personnel such as law enforcement officials, medical personal, and the like. Further, it should be understood that in other example systems the emergency services network 120 may be any network that functions to request a location of a UE in order to provide a service based on the location.

Figure 2:
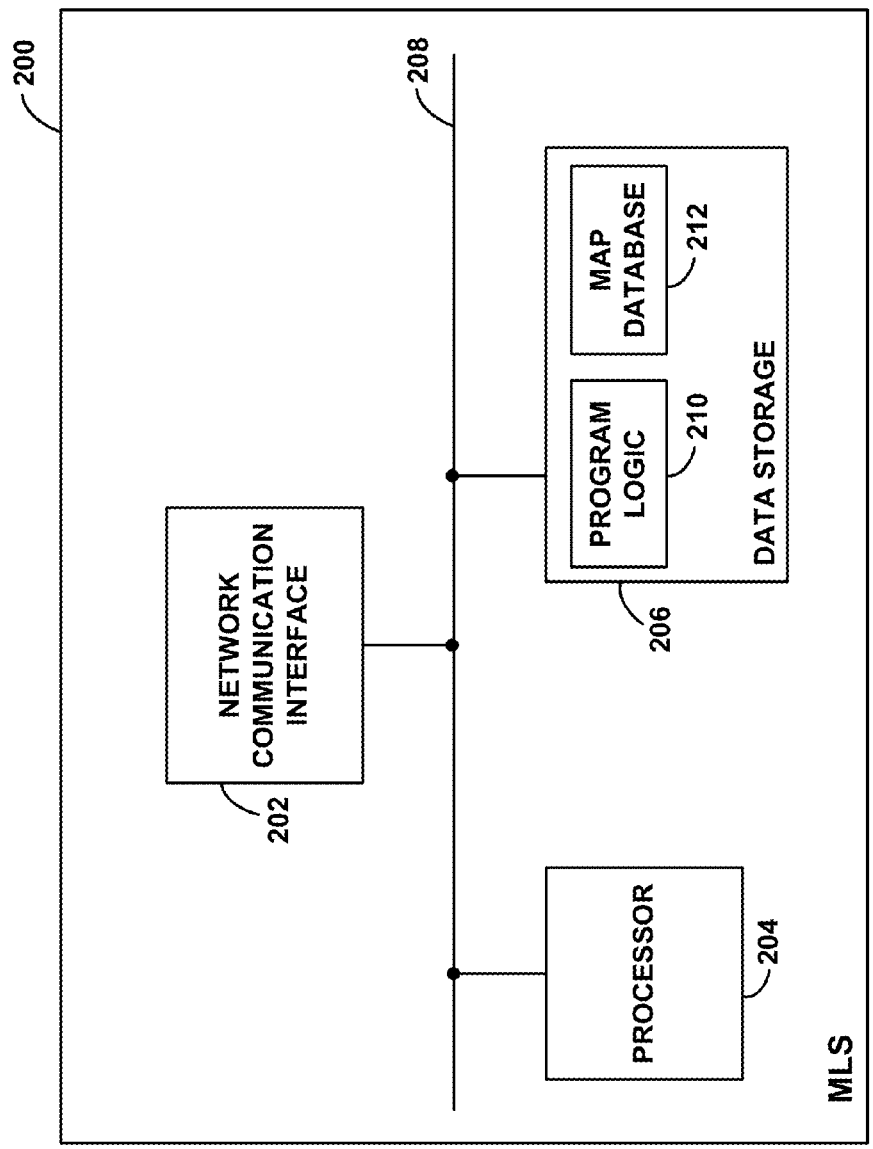
FIG. 2 depicts a simplified block diagram of a mobile location system (MLS), in accordance with an example embodiment.

FIG. 2 is next a simplified block diagram of an example MLS 200, which may be configured to operate in the example system 100 shown in FIG. 1 (e.g., MLS 114). As shown, the example MLS includes a network communication interface 202, a processor 204, and data storage 206, all of which may be communicatively linked together by a system bus, network, or other connection mechanism 208. The MLS may take other forms as well. For example, the MLS can in fact be a composition of numerous network nodes, including for instance numerous network servers or other entities. In some embodiments, the MLS 200 may include a MPC and PDE (not shown) as noted above. In other embodiments, however, the data storage 206 may include program logic 210 executable by the processor 204 to perform the functions of the MPC and the PDE so as to facilitate location determination, where the functions may include any of the functions described herein.

Network communication interface 202 comprises any type of interface for connecting the MLS 200 with a network (e.g., RAN 102) through which the MLS 200 can communicate with one or more UEs (e.g., UE 110) and with other entities. For instance, the network communication interface 202 may comprise a wired or wireless Ethernet interface that provides the MLS with connectivity to networks such as the transport networks 108 and emergency services network 120 noted above. Further, the network communication interface 202 may include an antenna structure and a chipset arranged to support communication according to one or more air interface protocols, such as those discussed above, for instance.

The processor 204 may comprise one or more general purpose processors (e.g., microprocessors) and/or more special purpose processors (e.g., application specific integrated circuits or the like) and may be integrated in whole or in part with the network communication interface 202.

The non-transitory data storage 206 may comprise one or more volatile and/or non-volatile storage components, particularly non-transitory storage, such as magnetic, optical, or flash memory for instance, and may be integrated in whole or in part with the processor 204. Additionally or alternatively, the non-transitory data storage 206 may be provided separately, as a non-transitory machine readable medium. As shown, the non-transitory data storage 206 may hold (e.g., contain, store, or be encoded with) program logic 210 (e.g., machine language instructions or other program instructions, markup or the like) executable by the processor to carry out various MLS functions described herein.

The non-transitory data storage 206 may also hold a map database 212 which may comprise consolidated map information which can be used by the MLS 200 for calculating or estimating a location of the UE 110. In practice, the map database 212 may comprise a network of entities such as nodes (e.g., road intersections), road segments, and areas contained by road segments, as well as representative locations of these entities. Further, each node and road segment may include respective attributes. For example, a particular node or road segment may include longitude and latitude coordinates. As another example, a particular road segment may include a name, a range of addresses, a speed range, and a road class, among other attributes. Still further, the map database 212 may comprise locations of other entities as well, such as base stations, geodetic markers (e.g., fire hydrants, trees, etc.), traffic control objects (e.g., stop signs, stoplights, etc.), buildings, and property boundaries, among others. Yet still further, the map database 212 may include classifications of geographic areas, namely urban, suburban, and rural areas. The map database 212 may comprise other information as well that can be utilized by the MLS 200 for location determination.

Moreover, the MLS 200 may be configured to periodically or continuously update the map database 212. The updating may involve adding locations of new entities, removing locations of entities that no longer exist, and/or updating locations of previously-stored entities.

The MLS 114 may receive from a requesting entity, such as emergency services network 120 (e.g., a PSAP), a request to provide a representative location of a particular UE, such as UE 110. In response to receiving the request, the MLS 114 (e.g., the MPC/PDE) may then determine the representative location of the UE 110 by applying a location determination process. In scenarios such as those noted above, this location determination process may determine an estimated (e.g., low-confidence, low-accuracy, etc.) location of the UE 110 rather than a precise location of the UE 110.

The location determination process may take various forms. For example, the location determination process may involve a triangulation process that takes into account base station signal delay measurements taken and reported by the UE 110. In particular, using known techniques (based on evaluation of signal phase, or the like), the UE 110 may measure the time that it takes for signals to travel respectively over the air from each of multiple base stations 104 operated by the UE's service provider (including the UE's serving base station) to the UE 110, and the UE 110 will report those base station delay measurements to the MLS 114. Using those delays, along with the known speed of the signals, the MLS 114 may then compute the distance between the UE 110 and each base station. In turn, for each base station, the MLS 114 may programmatically define an arc centered around a known fixed position of the base station and having a radius extending the distance from that position to the UE 110. The MLS 114 may then estimate the UE's location as the intersection of those arcs. As another example, the location determination process may involve a mixed cell advanced forward link trilateration (AFLT) process that may use base station almanac data for at least three base stations in communication with the UE 110. The AFLT process may be implemented similarly to the triangulation process noted above.

As yet another example, the location determination process may involve the MLS 114 determining as the location of the UE 110 the base station that defines the cell sector in which the UE 110 is operating. As still another example, the location determination process may involve determining the location of the UE 110 as or based on a predefined centroid of the cell sector in which the UE 110 is operating. Other examples are possible as well.

After the MLS 114 has determined the location of the UE 110, the MLS 114 may then transmit a report including the determined location to the emergency services network 120 or other requesting entity. In response to receiving the report, the emergency services network 120 may then provide a location-based service with respect to the determined location of the UE. For example, as discussed above, the emergency services network 120 may dispatch law enforcement personnel to the determined location of the UE. Other examples are also possible.

However, in some scenarios, because the determined location of the UE may only be an estimate of the UE's location, the determined location may coincide with an existing location of another entity. For instance, the determined location may be a centroid of the UE's cell sector which coincides with a location of a home residence, yet the UE may not actually be located at the home residence. The emergency services network 120 may then dispatch law enforcement personnel or other services to the home residence in error. As such, when the MLS 114 determines the location of the UE 110, the MLS 114 may need to adjust the determined location so that the determined location does not coincide with the existing location of the other entity, after which the MLS 114 can then provide the adjusted determined location to the emergency services network 120 or other requesting entity. Accordingly, the present method helps to address this need.

III. Example Operation

Figure 3:
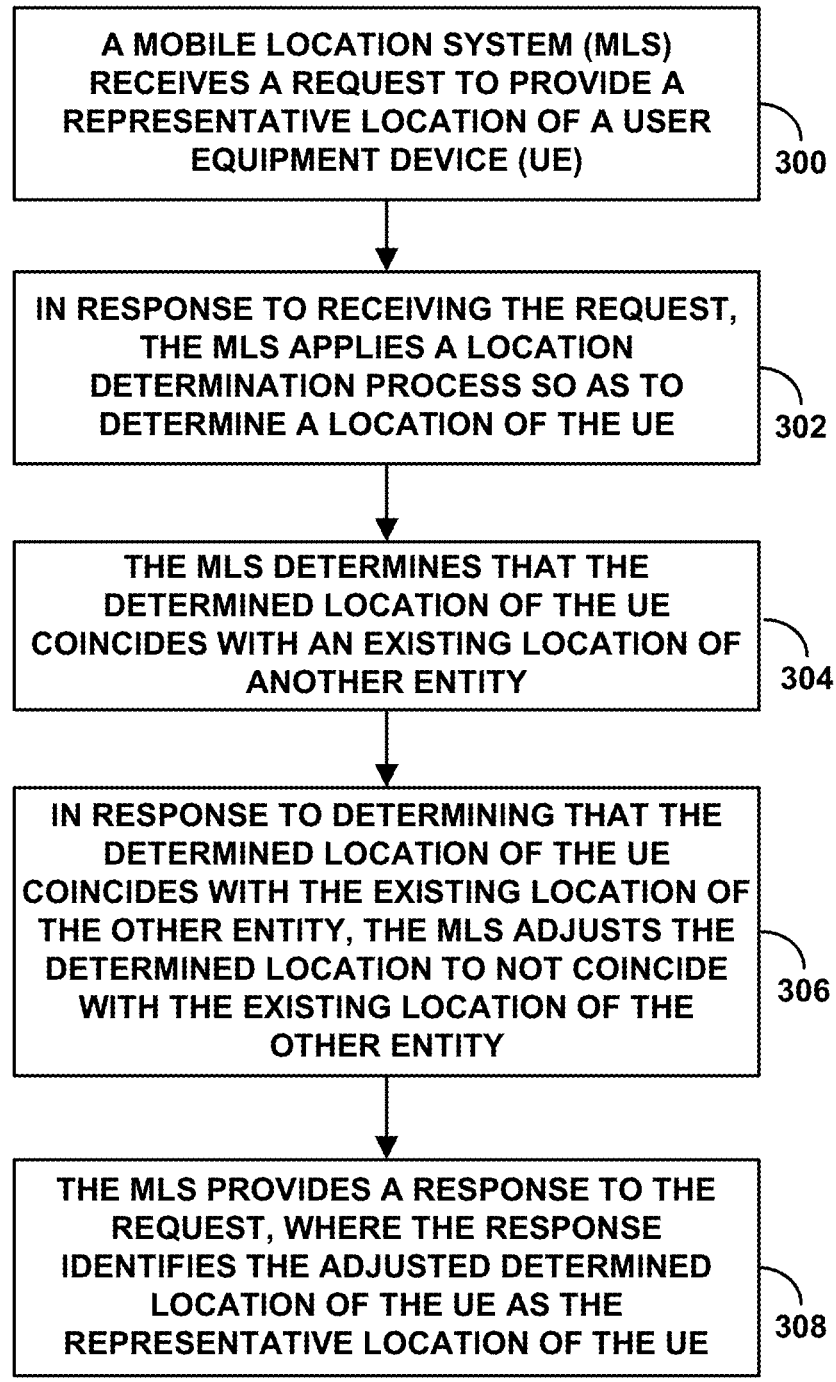
FIG. 3 is a flow chart depicting functions that can be carried out in accordance with an example embodiment.

FIG. 3 is a flow chart depicting functions that can be carried out in accordance with the present method. For the sake of example, the present method will be assumed to be carried out by an MLS with respect to the network arrangement illustrated in FIG. 1 and the example MLS illustrated in FIG. 2. It should be understood, however, that in other examples, the present method may also be carried out with respect to other network arrangements. The present method may include one or more operations, functions, or actions as illustrated by one or more of blocks 300-308. Although the blocks are illustrated in a sequential order, the functions illustrated by the blocks may also be performed in parallel, and/or in another order different than those described herein.

At block 300, the method involves an MLS receiving a request to provide a representative location of a UE. The request may come from an emergency services network or other requesting entity. Then, at block 302, the method involves, in response to receiving the request, the MLS applying a location determination process so as to determine a location of the UE. Further, at block 304, the method involves the MLS determining that the determined location of the UE coincides with an existing location of another entity. In some scenarios, the other entity may be a private address, such as a home residence, an educational institution, a religious institution, a medical institution, and a military institution, among other possibilities.

Still further, at block 306, the method involves, in response to determining that the determined location of the UE coincides with the existing location of the other entity, the MLS adjusting the determined location to not coincide with the existing location of the other entity. At block 308, the method then involves the MLS providing a response to the request, where the response identifies the adjusted determined location of the UE as the representative location of the UE (e.g., providing the longitude and latitude coordinates of the adjusted determined location). Namely, the response may identify the adjusted determined location of the UE as the representative location of the UE rather than identify the determined location of the UE as the representative location of the UE. The MLS may provide/send the response to the requesting entity.

To perform the adjustment noted above, the MLS may engage in a process in which the MLS may consider one or more locations that do not coincide with the location of the other entity so as to provide a requesting entity with a better estimate of the UE's actual location. The process may involve the MLS identifying a candidate adjustment location that does not coincide with the location of the other entity, and may identify the candidate adjustment location by referring to a consolidated map database stored at the MLS, such as the map database 212 noted above. The candidate adjustment location may be one of the map database entities noted above, such as a particular road segment.

In some embodiments, the MLS may identify the candidate adjustment location by identifying a type of geographical area of the base station or cell sector in which the UE is operating. For instance, the geographical area may be a dense urban area with many identifiable candidate adjustment locations. Alternatively, the geographical area may be a suburban area or rural area with less identifiable candidate adjustment locations than an urban area.

After identifying the candidate adjustment location, the MLS may then determine, using various algorithms, whether the identified candidate adjustment location is within a threshold distance from the determined location. If the MLS determines that the identified candidate adjustment location is within the threshold distance from the determined location, the MLS may adjust the determined location to coincide with the identified candidate adjustment location, thereby designating the identified candidate adjustment location as the adjusted determined location. However, if the MLS determines that the identified candidate adjustment location is not within the threshold, the MLS may identify another candidate adjustment location that does not coincide with the other entity, such as a geodetic marker or traffic control object.

Furthermore, after identifying the other candidate adjustment location, the MLS may then determine whether the other identified candidate adjustment location is within the threshold distance from the determined location. If the MLS determines that the other identified candidate adjustment location is within the threshold distance, the MLS may adjust the determined location to coincide with the other identified candidate adjustment location, thereby designating the other identified candidate adjustment location as the adjusted determined location. However, if the MLS determines that the other identified candidate adjustment location is not within the threshold distance, the MLS may adjust the determined location to coincide with a default location, such as a property boundary closest in proximity to the determined location, thereby designating the default location as the adjusted determined location.

In line with the discussion above, the MLS may be programmed, in practice, to consider certain entities as candidate adjustment locations prior to considering other entities as candidate adjustment locations. Therefore, it should be understood that while in some examples described herein the MLS may consider entities such as road segments prior to considering entities such as geodetic markers or property boundaries, the MLS may consider geodetic markers or property boundaries prior to considering road segments in other examples. Other examples not described herein are also possible.

Figure 4:
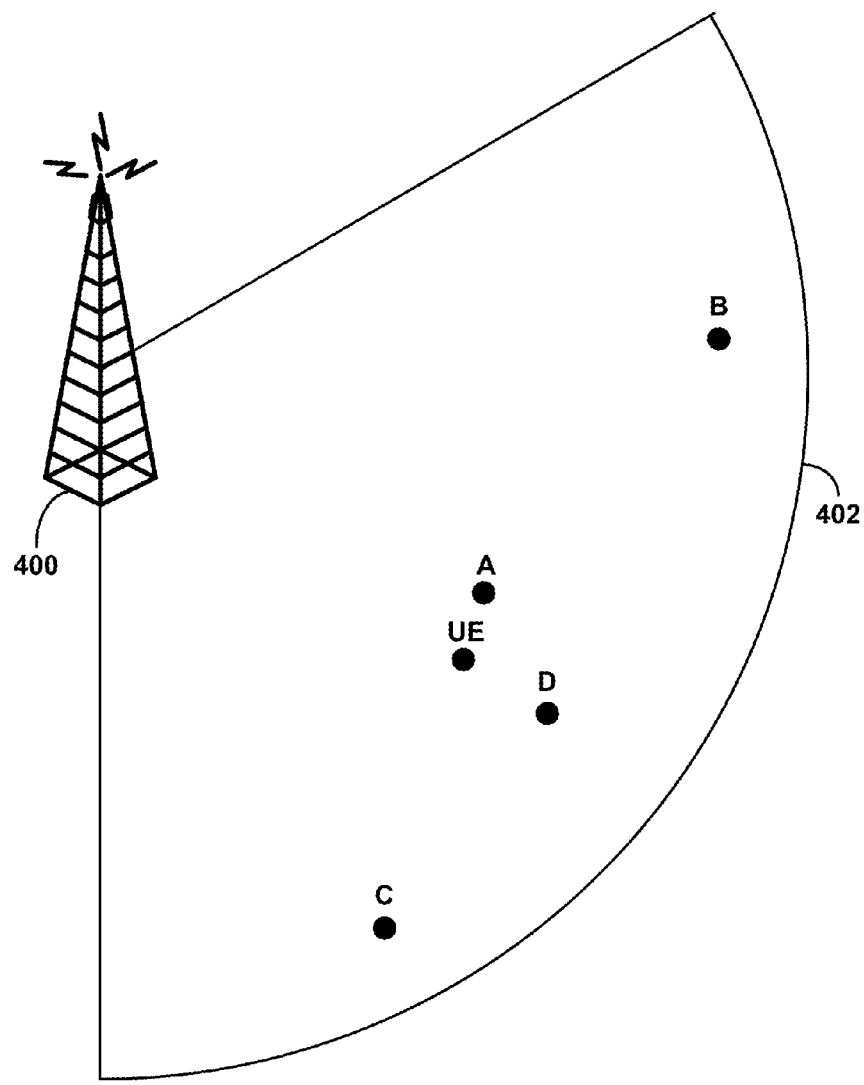
FIG. 4 depicts a cell sector in which an example user equipment device (UE) can operate in accordance with an example embodiment.

FIG. 4 depicts an example base station 400 and cell sector 402 in accordance with an example implementation of the method just described. In this implementation, the MLS may apply a location determination process to determine a location of the UE in response to receiving a request to provide a representative location of the UE from a requesting entity. For instance, the MLS may use the location determination process to determine the location of the UE to be point A. Point A may be a centroid of the cell sector 402 as shown. However, as also shown, the UE may not actually be located at point A.

The MLS may then determine that point A coincides with an existing location of a private address or other undesirable address. Based on this determination, the MLS may identify point B as a candidate adjustment location. Point B, for instance, may be a location of a road segment. However, point B may not be within a threshold distance from point A, and thus the MLS may identify point C (e.g., a location of a geodetic marker, for instance) as another candidate adjustment location. However, point C may also not be within the threshold distance from point A, and the MLS may thus identify point D (e.g., a location of a property boundary) as a default location that is within the threshold distance from point A. The MLS may then output longitude and latitude coordinates of point D as the representative location of the UE and report the representative location to the requesting entity.

Figure 5:
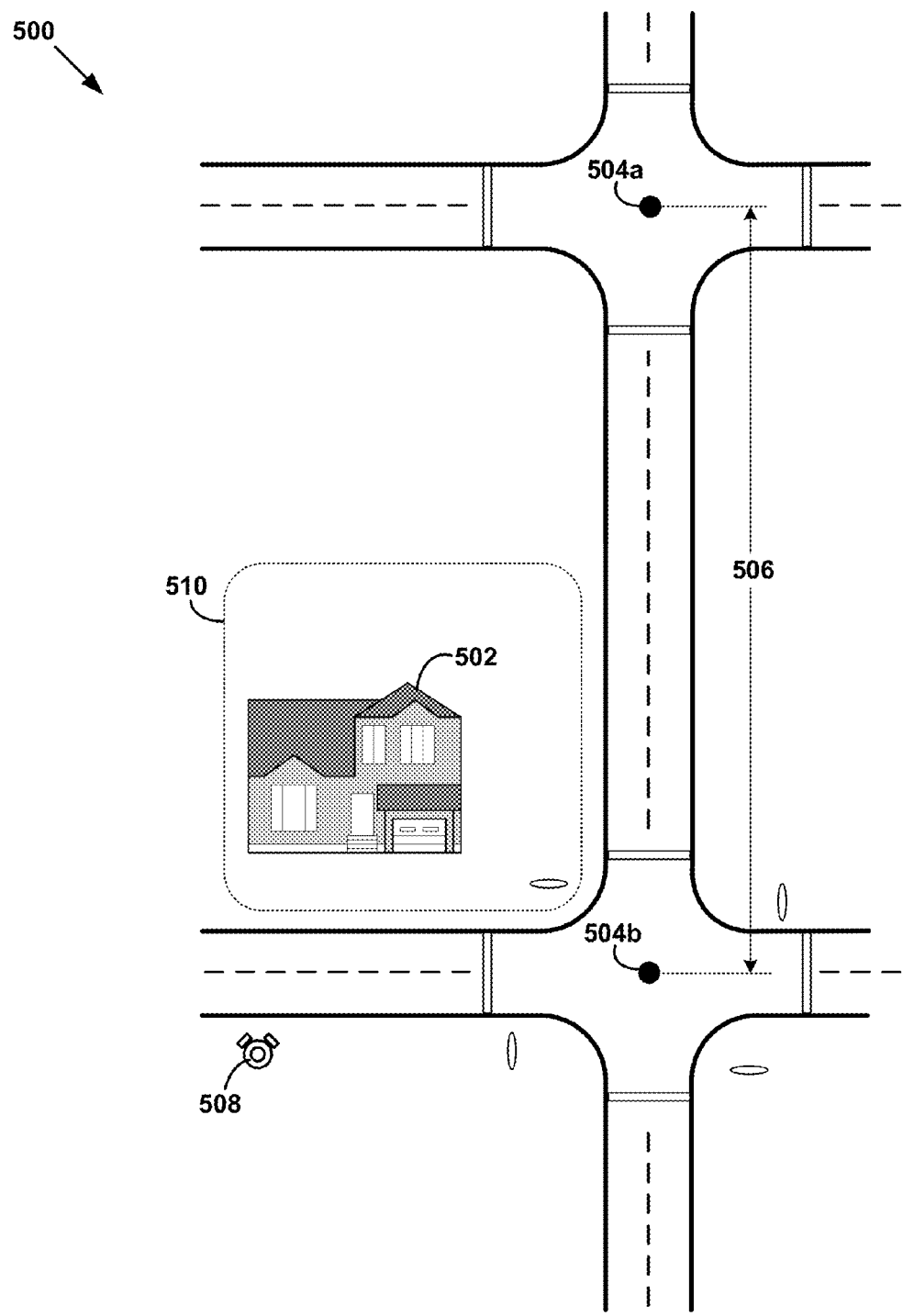
FIG. 5 depicts a map that may be used by a MLS, in accordance with an example embodiment.

FIG. 5 depicts a map 500 including a home residence 502 and a surrounding area of the home residence 502, in accordance with a more detailed implementation of the method described above. The map 500 also includes two nodes 504a-b associated with road intersections, a road segment 506 connecting the nodes 504a-b, a fire hydrant 508, and a property boundary 510 of the home residence 502.

In line with the discussion above, the MLS may receive from a requesting entity such as a PSAP a request to provide a representative location of a UE. In response to receiving the request, the MLS may apply a location determination process that determines a location of the UE that coincides with the home residence 502. The MLS may then seek to identify a candidate adjustment location that does not coincide with the home residence 502. For instance, the MLS may identify the road segment 506 as the candidate adjustment location. If the MLS determines that the road segment 506 is within a threshold distance from the home residence 502, the MLS may output as the representative location of the UE the location of the home residence 502. The MLS may then report the location of the road segment 506 to the PSAP. In response, the PSAP may dispatch emergency services to the location of the road segment 506 rather than to the home residence 502. However, if the MLS determines that the road segment 506 is not within the threshold distance, the MLS may then consider other candidate adjustment locations, such as the fire hydrant 508 or the property boundary 510 of the home residence 502, in accordance with the process described above.

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   a mobile location system (MLS) receiving a request to provide a representative location of a user equipment device (UE);
   in response to receiving the request, the MLS applying a location determination process so as to determine a location of the UE;
   the MLS determining that the determined location of the UE coincides with an existing location of another entity;
   in response to determining that the determined location of the UE coincides with the existing location of the other entity, the MLS adjusting the determined location to not coincide with the existing location of the other entity; and
   the MLS providing a response to the request, wherein the response identifies the adjusted determined location of the UE as the representative location of the UE.

2. The method of claim 1, wherein applying the location determination process so as to determine the location of the UE comprises determining the location of the UE based on a centroid of a wireless coverage area in which the UE is operating.

3. The method of claim 1, wherein applying the location determination process so as to determine the location of the UE comprises determining the location of the UE using trilateration based on known locations of three or more base stations proximate to the UE and operated by the UE's service provider.

4. The method of claim 1, wherein applying the location determination process so as to determine the location of the UE comprises determining the location of the UE using triangulation based on known locations of three or more base stations proximate to the UE and operated by the UE's service provider.

5. The method of claim 1, wherein the other entity is a private address.

6. The method of claim 5, wherein the private address includes one or more of: a home residence, an educational institution, a religious institution, a medical institution, and a military institution.

7. The method of claim 1, wherein adjusting the determined location to not coincide with the existing location of the other entity comprises:
   identifying a candidate adjustment location that does not coincide with the existing location of the other entity;
   making a determination of whether the identified candidate adjustment location is within a threshold distance from the determined location; and
   responsive to the determination being that the identified candidate adjustment location is within the threshold distance, designating the identified candidate adjustment location as the adjusted determined location.

8. The method of claim 7, wherein identifying the candidate adjustment location comprises identifying the candidate adjustment location using a consolidated map database stored at the MLS.

9. The method of claim 8, further comprising the MLS periodically updating the consolidated map database.

10. The method of claim 7, wherein the candidate adjustment location is a road segment.

11. The method of claim 1, wherein adjusting the determined location to not coincide with the existing location of the other entity comprises:
    identifying a candidate adjustment location that does not coincide with the existing location of the other entity;
    making a determination of whether the identified candidate adjustment location is within a threshold distance from the determined location; and
    responsive to the determination being that the identified candidate adjustment location is not within the threshold distance,
    (i) identifying another candidate adjustment location that does not coincide with the existing location of the other entity,
    (ii) making a determination of whether the other identified candidate adjustment location is within a threshold distance from the determined location, and
    (iii) responsive to the determination being that the other identified candidate adjustment location is within the threshold distance, designating the other identified candidate adjustment location as the adjusted determined location.

12. The method of claim 11, wherein the other candidate adjustment location is a geodetic marker or a traffic control object.

13. The method of claim 1, wherein adjusting the determined location to not coincide with the existing location of the other entity comprises:
    identifying a candidate adjustment location that does not coincide with the existing location of the other entity;
    making a determination of whether the identified candidate adjustment location is within a threshold distance from the determined location; and
    responsive to the determination being that the identified candidate adjustment location is not within the threshold distance,
    (i) identifying another candidate adjustment location that does not coincide with the existing location of the other entity,
    (ii) making a determination of whether the other identified candidate adjustment location is within a threshold distance from the determined location, and
    (iii) responsive to the determination being that the other identified candidate adjustment location is not within the threshold distance, designating, as the adjusted determined location, a property boundary that is within a threshold distance from the determined location.

14. A mobile location system (MLS) comprising:
a network communication interface;
at least one processor;
data storage; and
program logic stored in the data storage and executable by the processor to carry out functions comprising:
receiving, via the network communication interface, a request to provide a representative location of a user equipment device (UE),
in response to receiving the request, applying a location determination process so as to determine a location of the UE,
determining that the determined location of the UE coincides with an existing location of another entity,
in response to determining that the determined location of the UE coincides with the existing location of the other entity, adjusting the determined location to not coincide with the existing location of the other entity, and
providing, via the network communication interface, a response to the request, wherein the response identifies the adjusted determined location of the UE as the representative location of the UE.

15. The MLS of claim 14, wherein receiving the request comprises receiving the request from a public safety answering point (PSAP).

16. The MLS of claim 14, wherein the adjusted determined location is a location of an entity selected from the group consisting of a road segment, a geodetic marker, a traffic control object, and a property boundary.

17. The MLS of claim 14, wherein determining that the determined location of the UE coincides with the existing location of the other entity comprises identifying a geographic area that encompasses the determined location, wherein the geographic area is selected from the group consisting of: an urban area, a suburban area, and a rural area.

18. A non-transitory computer-readable medium having stored thereon program instructions executable by a mobile location system (MLS) to cause the MLS to perform functions comprising:
receiving a request to provide a representative location of a user equipment device (UE);
in response to receiving the request, applying a location determination process so as to determine a location of the UE;
determining that the determined location of the UE coincides with an existing location of another entity;
in response to determining that the determined location of the UE coincides with the existing location of the other entity, adjusting the determined location to not coincide with the existing location of the other entity; and
providing a response to the request, wherein the response identifies the adjusted determined location of the UE as the representative location of the UE.

19. The non-transitory computer-readable medium of claim 18, wherein the response identifying the adjusted determined location of the UE as the representative location of the UE comprises the response identifying the adjusted determined location of the UE as the representative location of the UE without identifying the determined location of the UE as the representative location of the UE.

20. The non-transitory computer-readable medium of claim 18, wherein the adjusted determined location of the UE is within a threshold distance from the determined location, and wherein the adjusted determined location of the UE is a location of an entity selected from the group consisting of a road segment, a geodetic marker, a traffic control object, and a property boundary.

* * * * *